Patented Nov. 25, 1947

2,431,371

UNITED STATES PATENT OFFICE 2,431,371

FEED AND METHOD OF MAKING

Ellis W. Coates, Squantum, Mass.

No Drawing. Application December 18, 1945,
Serial No. 635,779

6 Claims. (Cl. 99—9)

This invention relates to feed for animals and the method of making it. More particularly, it relates to a feed containing a large proportion of agave pulp in processed condition substantially free from saponin and of high content of sugars, vitamins, and desirable minerals.

The agave pulp, a by-product of the making of sisal or like fibers, has been practically a waste product for a long time, although it has been known to contain both chlorophyll and vitamin A or the precursor, i. e. carotene. It has been known also to be high in nutritive value as shown by the following analysis of a representative specimen.

*Analysis of an agave pulp*

| Ingredient | Per Cent by Weight |
|---|---|
| Water | 11.50 |
| Ash | 7.87 |
| Protein | 6.19 |
| Fat | 2.54 |
| Fiber | 17.80 |
| Carbohydrate (by difference) | 54.10 |
| | 100.00 |

A possible reason why this pulp has not found wide distribution as a feed is the known occurrence of saponin in certain species of agave plants and also the fact that the saponin is toxic to animals. Thus there is a reference in Chemical Abstracts, vol. 32, page 5500, to an article by Matthews reporting an investigation of the cause of poisoning of goats, sheep and to a limited extent cattle in the Southwest as a result of grazing on leaves of *Agave lechuguilla*. The conclusion is that the losses under conditions on the range are due primarily to the saponin content of certain parts of the plant of this species.

This invention provides a method for ensuring the absence of any objectionable proportion of saponin in the agave pulp from any species of the plant. The invention provides another feature which is more important in the pulp from such commercially important species of agave as sisal or henequen, namely, provision of increased sugar and vitamin content.

Briefly stated, the invention comprises establishing the pH of a wet agave pulp composition in contact with glucosidases within a range favorable to the action of glucosidases, which are known to have the power of decomposing glucosides such as saponin, and maintaining the resulting mixture at a temperature favorable to enzymatic action until no substantial proportion of saponin remains. In the preferred embodiment the invention comprises mixing agave pulp, advantageously after rupture of cell walls, as by drying and subsequent strong compression, with distillery slop or a concentrate therefrom, establishing the pH within the range of approximately 3 to 6, and then maintaining the mixture in contact with a glucosidase or other carbohydrase at a temperature between room temperature as a minimum and, as a maximum, the temperature which prevents enzyme action, until there is a substantial increase in the content of sugar and there is formed a product of satisfactory vitamin content that is high in total digestive materials.

In general, the method includes mixing the agave pulp with an aqueous medium such as water or distillery slop so as to form a mix in which all particles of the pulp are moistened. Acidity is established within the range favorable for enzyme action and bacteria or enzymes including suitably diastase and a glucosidase, such as emulsin or invertase, are added unless those agents are already present in the raw materials selected for use. If acid is added as such, dilute hydrochloric acid, phosphoric or sulfuric is suitable, the acid being added with usual precautions and stirred in quickly until test for pH shows the desired level. Nutrients of kind commonly required for bacterial growth or enzyme action are added, as for instance, phosphates, urea, and ammonium sulfate.

The mixture so made is then maintained at a temperature suitable for enzyme action, as, for instance, at 60° to 70° until diastatic action is practically complete and then at 40° C. until the enzymes that are most active in the lower range of temperatures have served their purpose. When distillers slop, the preferred aqueous medium, has been mixed with the agave pulp, it has been found that there is a diastatic conversion of unfermented carbohydrate in the distillers slop to sugars as shown by analysis with Fehling's solution.

The period of maintenance of the composition, including the agents required for enzymatic action, varies with the temperature of the mass. When the temperature maintained is the optimum for the particular enzyme action or actions being effected, then the time is relatively short. Within the specific ranges of temperature given immediately above, for example, a time of one to three days is about right, this time being divided approximately equally between the diastatic and the subsequent enzyme action. If, however, time is not important in the manufacturing operation, then the wet mass of established pH and content of enzymes is allowed to stand for a longer time at prevailing atmospheric or room temperatures, as, for instance, three to ten days at temperatures above freezing but below the temperature at which enzyme action is destroyed and suitably between room temperature and this higher temperature.

It will be understood that the enzymes particularly those which decompose glucosidases and increase the vitamin content may be added in the form of yeast or bacteria of kind ordinarily added to give the desired fermentation from carbohydrates to sugars and other products including vitamins.

The distillery slop selected, when this is the aqueous medium to be mixed with the agave pulp, as it preferably is, is one of the usual commercial kinds. Examples are the watery mass which remains behind after distilling away the alcoholic material in the process of making industrial alcohol or whisky from rye, wheat or the like. After these grains in wet condition have been treated with barley malt and then fermented by yeast and the alcoholic content distilled away, the remaining non-volatilized residue or distillery slop is suitably mixed with the agave pulp at a temperature at least approximately equal to that most favorable to diastatic action, namely, about 60° to 70° C. In place of distillery slop there may be used "brewer's grains," in aqueous mixture.

The agave pulp selected is of the kind described and for best results is a pulp that has been processed in advance so as to rupture the cells. This processing exposes to the enzymatic action, which I utilize, material that is normally enclosed in cell walls through which the enzymes diffuse at the best only very slowly.

The rupture of the cell walls of the agave pulp is effected to advantage by strong compression as, for instance, at 10,000 to 20,000 lbs. per square inch. The rupture or other features accompanying this processing are to be considered satisfactorily complete for my purpose when the agave pulp, after subjection to very high pressure, at a moisture content of about 6 to 8%, shows only little resilience or spring-back when the pressure is released.

Because of the drying process, to which the agave pulp is ordinarily subjected, the diastase therein is in inactive condition. This diastase is activated by the distillery slop, particularly when the pH is established as stated within the range 3 to 6. Actually I prefer for best results to establish the pH within a more narrow range as between 4 and 5. The diastase then acts upon residual carbohydrates of the slop, to give sugars. Hydrolysis of carbohydrates of the pulp also occurs to a substantial and important extent.

The agave pulp and slop are mixed in proportions that may vary from the minimum of slop required to wet all the pulp up to the maximum that may be absorbed by the pulp, say up to 40 parts by weight of the slop to 1 part of the pulp.

The invention will be illustrated in addition by description in connection with the following specific examples of the practice of it.

Example 1

Ten to 30 parts by weight of agave pulp are mixed with 400 parts of distillery slop. The pH is established within the range 4 to 5 and the mixture is caused to stand at temperatures of 30° to 37° C. for a 48-hour period. In addition to vitamins, the finished product of this secondary fermentation is rich in mineral matter. It has been fed to livestock as the grain component of the feeding schedule with excellent results in milk production.

Example 2

The method of Example 1 is modified by maintaining the mixture of pulp and slop at 10° to 25° for three days to a week.

Example 3

Agave pulp is mixed with 20 times its weight of water, dilute hydrochloric acid to establish the pH at 4 to 5, barley malt and yeast, and nutrient (small) proportions of urea, ammonium sulfate, and ammonium phosphate.

Example 4

Crushed agave pulp from the sisal plant is mixed with distillery slop in amount to wet all the pulp and at a temperature of the slop of at least 60° C. The pH is established at 3 to 6. The whole is caused to cool gradually through the optimum range for diastatic action and then the optimum for glucosidase and yeast activity, to a final temperature not above 37° C.

Example 5

Any product made as described above is neutralized by addition of sodium carbonate, hydroxide, tertiary phosphate, or like non-toxic alkali, in amount to raise the pH to any value desired in the feed, say to 6 to 7.

It will be understood also that it is intended to cover all changes and modifications of the example of the invention herein chosen for the purpose of illustration which do not constitute departures from the spirit and scope of the invention.

What I claim is:

1. The method of making feed for animals which comprises adding an aqueous medium to agave pulp so as to moisten the pulp, establishing within the moist mass a pH of 3 to 6, and maintaining the resulting mixture in contact with carbohydrase enzymes and at a temperature between atmospheric as a minimum and as a maximum the temperature of prevention of enzymatic action until a substantial proportion of products of such action have been obtained.

2. The method described in claim 1, the enzymes including a glucosidase to destroy saponin.

3. The method of making feed for animals which comprises adding distillery slop to agave pulp, the pulp supplying carbohydrase enzymes that are active upon the residual carbohydrate content of the slop and the slop supplying inorganic nutrients for enzyme action, establishing within the moist mass a pH of 3 to 6, and maintaining the resulting mixture in contact with enzymes and at a temperature between atmospheric as a minimum and as a maximum the temperature of prevention of enzymatic action until a substantial proportion of products of such action have been obtained.

4. The method of making feed for animals which comprises adding distillery slop at a temperature of at least 60° C. to agave pulp, the pulp supplying enzymes that are active upon the residual carbohydrate content of the slop and the slop supplying inorganic nutrients for enzyme action, cooling the resulting mass gradually through the ranges of temperature known to be the optimum for activity for the various enzymes and finally to a temperature not above 37° C.

5. A feed comprising a mixture of the solid ingredients of both agave pulp and distillery slop and enzymatic hydrolysis products of the said mixture.

6. A feed comprising a mixture of the solid ingredients of both agave pulp and brewer's grains and enzymatic hydrolysis products of the said mixture.

ELLIS W. COATES.

REFERENCES CITED

The following references are of record in the file of this patent:

UNITED STATES PATENTS

| Number | Name | Date |
|---|---|---|
| 1,073,591 | Christensen | Sept. 23, 1913 |
| 2,095,638 | Jeffreys | Oct. 12, 1937 |
| 1,587,101 | Woolmer | June 1, 1926 |

FOREIGN PATENTS

| Number | Country | Date |
|---|---|---|
| 272,447 | Great Britain | 1928 |